(12) United States Patent
Zermani et al.

(10) Patent No.: US 7,357,869 B2
(45) Date of Patent: Apr. 15, 2008

(54) METHOD FOR MAKING A MECHANICAL INTERLOCK FOR FILTERS

(75) Inventors: Thomas Zermani, Peabody, MA (US); James Groves, Annisquam, MA (US); Brian Foley, Westford, MA (US)

(73) Assignee: Millipore Corporation, Billerica, MA (US)

( * ) Notice: Subject to any disclaimer, the term of this patent is extended or adjusted under 35 U.S.C. 154(b) by 448 days.

(21) Appl. No.: 10/919,203

(22) Filed: Aug. 16, 2004

(65) Prior Publication Data

US 2005/0016916 A1  Jan. 27, 2005

(51) Int. Cl.
*B01D 29/01* (2006.01)
*B01D 29/52* (2006.01)

(52) U.S. Cl. ............... 210/542; 264/138; 264/DIG. 48; 83/616; 422/101

(58) Field of Classification Search ........ 264/DIG. 48, 264/138; 210/542, 451, 499; 422/101; 83/616
See application file for complete search history.

(56) References Cited

U.S. PATENT DOCUMENTS

| 2,234,849 | A | * | 3/1941 | Wales .......................... 83/109 |
| 3,295,686 | A | | 1/1967 | Krueger |
| 3,658,183 | A | | 4/1972 | Best |
| 5,284,586 | A | | 2/1994 | DeSalvo |
| 5,288,300 | A | | 2/1994 | Hartung et al. |
| 6,309,605 | B1 | * | 10/2001 | Zermani ..................... 422/101 |

FOREIGN PATENT DOCUMENTS

DE  44 34 800 A  4/1996
FR  2 647 512  11/1990

\* cited by examiner

*Primary Examiner*—Terry K Cecil (57) ABSTRACT

The present invention provides a mechanical lock for securing one or more filters within a filtration device and methods for producing the mechanical lock. The use of an interference fit punch causes a portion of the inner surface of the wall to be skived and rolled along the wall until it reaches the desired location where it forms a mechanical crimp to retain the one or more filters within the device. In one embodiment, the inner surface has an inwardly taper. In the other, it has straight walls or outwardly tapered walls. The use of a gasket such as an O-ring on top of the filter before the wall is skived provides a liquid tight seal.

7 Claims, 8 Drawing Sheets
(3 of 8 Drawing Sheet(s) Filed in Color)

METHOD FOR MAKING A MECHANICAL INTERLOCK FOR FILTERS

BACKGROUND OF THE INVENTION

The MULTISCREEN® Harvest Plate is a 96-well plate designed and optimized for cell harvesting applications. The plate is a single molded device having 96 distinct and separate wells into which is inserted a glass fiber mat filter which is used for retaining cells or other selected items. The plate has been well received, as its individual wells were specifically designed to have no cross talk between the wells.

The glass fiber disc was stuffed into each well such that the disc had an interference fit with the sides and/or bottom of the well. Lab tests of the plate were very successful, so the product was launched.

Unfortunately, the plate was not robust for all applications. It was learned that the plates are handled quite roughly, for example typically being loaded haphazardly into liquid filled drums. Many of the discs became dislodged as they were only held in by an interference fit.

Any dislodgment was unacceptable, so a means for securing the glass fiber disc had to be determined. Yet, the filter disc had to be secured without adding another molding step to minimize the cost and avoid the cross talk issue. As no other single-molded-plate was available on the market, no multiple-molded plate sold in the prior art offered a solution.

In two piece multiple well plates, e.g. those having a separate underdrain plate and a mating open welled top plate, the same means for securing the filter in the well has been used. When that has been found to be insufficient, other means such as ultrasonically welding the filter to one of the two components or using an O-ring above the filter have been tried. While these methods have worked to some degree they are slow, costly and time consuming.

Accordingly, it was desirable to provide a multiple well plate, whether a single molded design or a two piece design, that had its filtration material secured therein such that it did not come dislodged during usage.

In addition, it would be desirable to provide a process for making such plates.

SUMMARY OF THE INVENTION

This invention provides a mechanical interlock for securing the filter inside a receptacle designed to receive such filter. Specifically, the interlock is material from the inner wall of the device formed in such a manner that the material prevents the filter from moving but also remains fixed to the wall of the device. Preferably, the wall of the device is skived in a manner that the material of the device wall is peeled therefrom, without breaking off, until it is in contact with the filter to be fixed therein. The interlock prevents the filter, typically in the form of a disc, from moving and since a portion of the interlock remains fixed to the wall of the device, the result is a sturdy mechanically fixed filter within a device.

The inner wall of the device may be straight, outwardly tapered or inwardly tapered (the taper being defined relative to the central vertical axis of the well of the device as defined from the top (open portion) of the device toward the bottom). In all of them, an interference fit punch causes a portion of the inner surface of the wall to be skived and rolled along the wall until it reaches the desired location where it forms a mechanical crimp to retain a filter within the device.

This invention also provides methods of skiving wall devices for the purpose of securing a filter therein.

BRIEF DESCRIPTION OF THE DRAWING

The patent or application file contains at least one drawing executed in color. Copies of this patent or patent application publication with color drawing(s) will be provided by the U.S. Patent and Trademark Office upon request and payment of the necessary fee.

FIGS. 5 a, b and c show alternative mechanical interlock forming device designs in cross-sectional view.

DESCRIPTION OF THE SPECIFIC EMBODIMENTS

Figure 1:
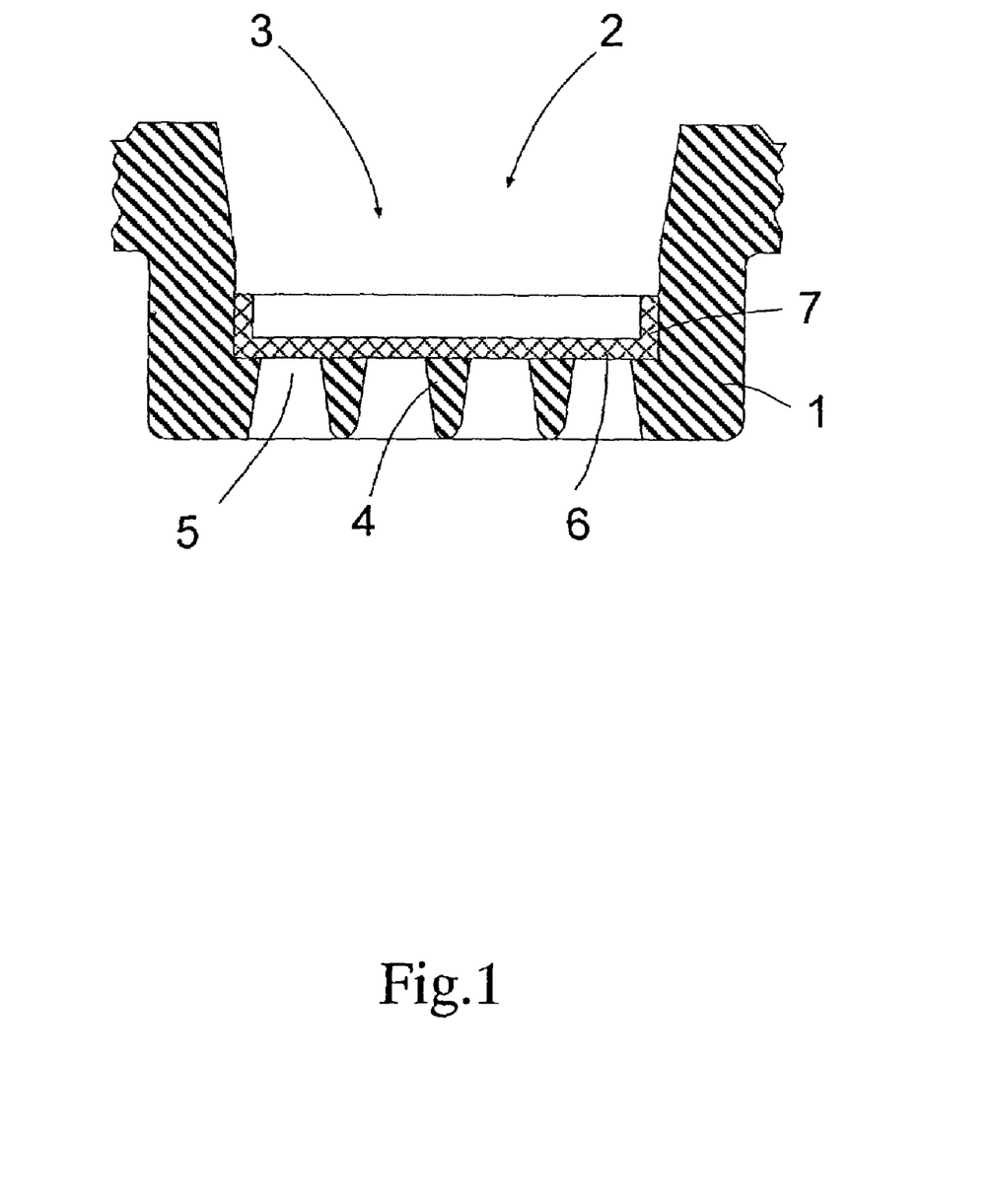
FIG. 1 illustrates a cross-section of a well of the present invention prior to formation of the mechanical interlock.

FIG. 1 provides a cross section of the interior of a device such as a well in a multiple well plate of the present invention prior to the formation of the mechanical interlock of the present invention. It shows the device 1 having one or more wells 2. Each well has an open top 3 and a closed bottom formed as an underdrain 4 in this example. The underdrain has one or more holes 5 which allow liquid to pass through under some type of driving force (positive pressure, vacuum or centrifugation). A filter 6 is shown as being in position against the underdrain 4. The filter, as shown has a diameter larger than the diameter of the well adjacent the underdrain 4 so that a portion 7 of the filter 6 is folded up along the sides of the well 2. This is the interference fit configuration of the devices of the prior art. While the embodiment shows the portion 7 extending up the wall to create an interference fit, it is not necessary although preferred in this invention. One can use filters having substantially the same diameter, dimension and cross-sectional configuration of the well area adjacent the underdrain 4. Alternatively, it may be smaller. In all embodiments, the size of the filter should be sufficient to ensure that a good mechanical interlock is formed.

FIG. 1 shows a well with an inwardly tapered diameter, e.g. the top inner diameter of the well is larger than the inner diameter of the well adjacent the underdrain 4. All or just a portion of the inner wall of the well may be inwardly tapered. Whether all or just some is tapered depends upon a number of factors and desires. In one embodiment, the entire length of the inner wall is tapered. In another, only that portion of the well between the top of the well and the location of the filter is tapered. In a further embodiment, a portion of the well adjacent to the top of the well is not tapered and the portion directly above the filter support device is inwardly tapered. In another embodiment of the present invention, the wall or a portion of it may taper outwardly. In a further embodiment the wall of the well is straight (substantially vertical or substantially perpendicular to the plane of the filter). All of these are possible and useful.

In any embodiment, the well needs to provide a sufficient amount of inner wall to form the mechanical interlock or skive necessary to hold the filter in place.

Figure 2:
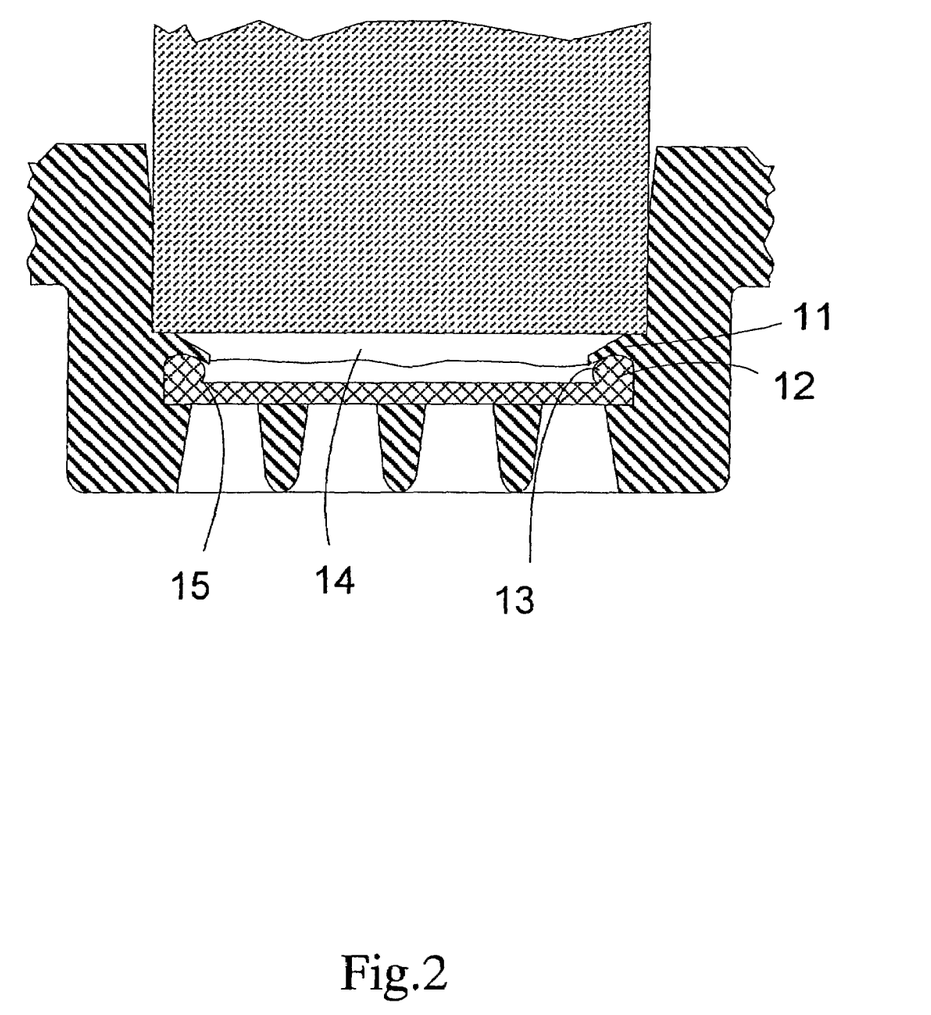
FIG. 2 illustrates a cross-section of a well of the present invention after formation of the mechanical interlock.

FIG. 2 shows the device of FIG. 1 after formation of the mechanical interlock. As can be seen a portion of the inner wall 11 has been skived and rolled on top of the filter 12 to form a mechanical interlock 13 against the filter 12 in the well 14. Also as shown in FIG. 2, the outer portion 15 of the filter 12 which had extended up along the inner wall 11 of the well 14 has been compressed and retained under the interlock 13.

Figure 3:
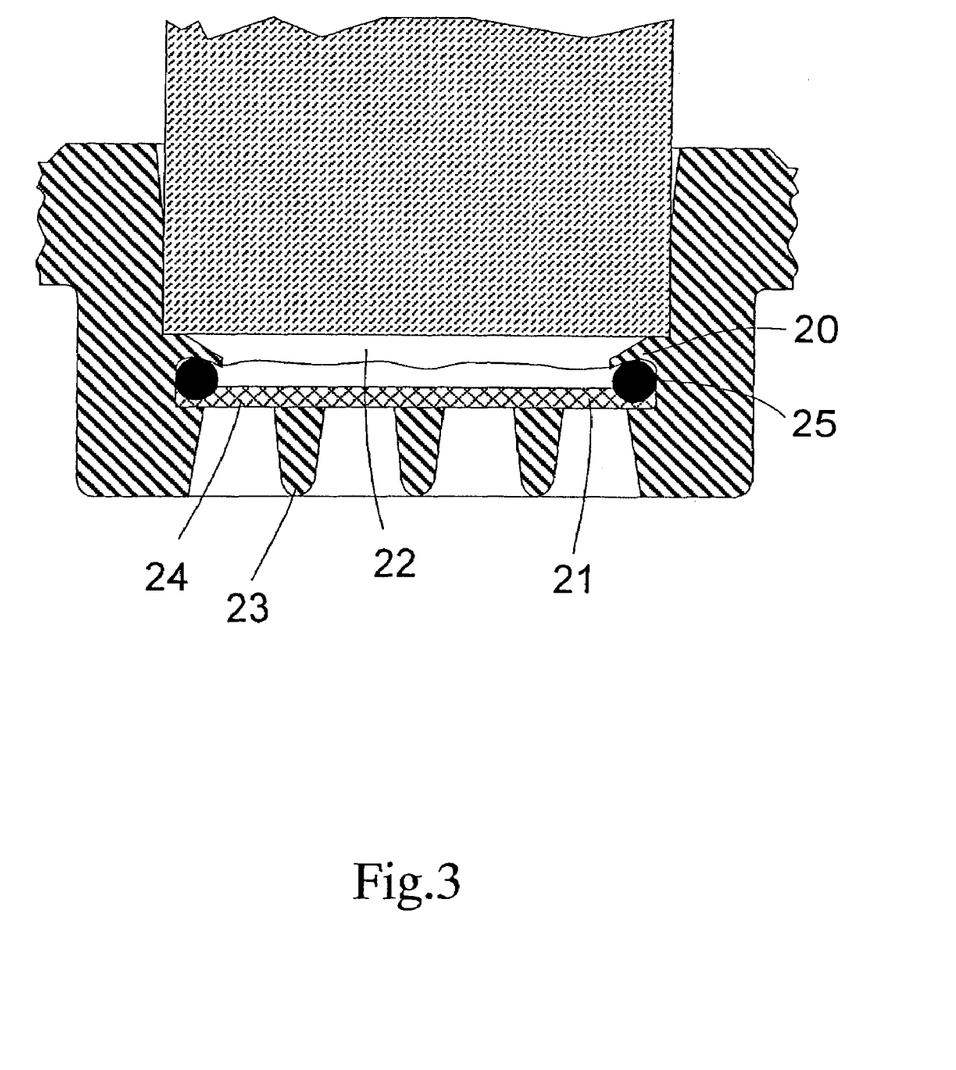
FIG. 3 illustrates a cross-section of a well of an alternative embodiment of the present invention after formation of the mechanical interlock.

FIG. 3 shows an alternative embodiment of the present invention. This embodiment may be used where either the membrane is not resilient and therefore tends to compress under pressure and not rebound and/or where one desires not only to have a mechanical interlock but also a liquid tight seal formed. In this embodiment, shown after formation of the interlock 20, the filter 21 is retained against the bottom of the well 22, in this example the bottom being an underdrain 23 having one or more holes 24 for fluid to pass through. A gasket 25, in this embodiment, an O-ring, is placed on top of the filter 21 before the formation of the mechanical interlock 20 and is retained by interlock 20 along with the filter 21.

As described in the embodiment of FIG. 1, the well wall may have a pitch or taper for the skiving device to come in contact therewith and form the skive that seals the filter in place. The pitch of well wall prior to skiving is 7 degrees. Other angles may be used as well. Typically an angle on an inwardly tapering wall is of from about 0 degrees to about 20 degrees, preferably from about 0 to about 10 degrees. As stated above all of the wall may be tapered, only a portion may be tapered or distinct portions may have different tapers.

In those embodiments using an outward taper the angle may be from about 0 degrees to about −20 degree, preferably from about 0 to about −10 degrees. As stated above, all of the wall may be tapered, only a portion may be tapered or distinct portions may have different tapers.

The cross-section of the well of the device may be any of those commonly used today such as round, oval, square and square with rounded corners. The cross-section is only a consideration when designing the proper skiving tool cross-section so that it fits within the well and forms the desired mechanical interlock. The diameter of the well may be whatever is used on single well or multiple welled devices. Typically, 96 well devices have wells with a crossectional diameter of about 0.23 inch (5.8 mm) to about 0.252 inch (6.4 mm). 384 welled devices have diameters of about 0.138 inch (3.5 mm) and 1564 welled devices have wells with diameters of about 0.067 inch (1.7 mm).

The material used to create the mechanical interlock, that is the skive, may be a styrene acrylonitrile polymer (SAN), but other materials are contemplated, such as polyolefins including polyethylene and polypropylene, polycarbonates, other styrene homopolymers and copolymers, PTFE resins, blends of polyolefins with small amounts of PTFE resins to reduce protein binding, ABS, acrylic resins, methacrylic resins and copolymers of either, BAREX® resin, nylons, epoxies polyurethanes and reinforced resins such as glass filled epoxy resins, and other such materials commonly used to make such devices, with or without fillers, pigments, etc as may be desired or required by the intended end use of the device.

The filter may be a glass fiber mat, or it may be any other material used to make membranes, such as a polymer, metal, ceramic or paper. Suitable membranes may be microfilters, ultrafilters or nanofilters, depending on the size of the material to be retained. Polymeric filters can be made of materials selected from the group consisting of nitrocellulose, cellulose acetate, polysulphones including polyethersulphone and polyarylsulphones, polyvinylidene fluoride, polyolefins such as ultrahigh molecular weight polyethylene, low density polyethylene and polypropylene, nylon and other polyamides, PTFE, thermoplastic fluorinated polymers such as poly (TFE-co-PFAVE), e.g. PFA, polycarbonates or particle filled membranes such as EMPORE® membranes available from 3M of Minneapolis, Minn. Chromatography papers, cellulosic structures containing chromatography media, ligands, a chemical treatment rendering them charged (positive or negative) or other such selective binding functionalities may also be used and are available from a variety of sources such as Whatman. Metal filters can be made of stainless steel, nickel or chromium such as the SF stainless steel filter or the NF nickel filter available from Millipore Corporation of Bedford, Mass.

All of these filters are well known in the art, may be symmetrical or asymmetrical or a combination of the two, composite (cast on to a separate preformed membrane support layer), may be in the form of mats, flat sheets, made as meshes or woven and non-wovens and are commercially available from a variety of sources including Durapore® membranes and Express® membranes available from Millipore Corporation of Bedford, Mass.

The underdrain as shown in FIG. 1 is integral with the plate of the present invention, so it is what the filter rests upon prior to the formation of the mechanical interlock. Other arrangements such as partial shelves, rims, lattice supports, undercuts and the like may be used to support the filter in place until the skive locks it to the underdrain or other such support.

It is contemplated that the present invention would be useful for mechanically locking multiple layers of filters into a filtration device, such as a pre-filter and a filter, thereby lengthening the life of the device while eliminating the need for expensive welding equipment such as ultrasonic welders or the use of adhesives such as epoxies or thermal bonding technology. Alternatively multiple filters could be locked sequentially into a well separated by the height of the mechanical interlock formed between each layer of filter. These may have simple open spaces between the layers of filter or the spaces may be filled with chromatography media, absorptive materials and the like.

The plate may be a single molded plate having an integral underdrain formed in it as shown in FIG. 1 or it may be a two piece plate comprised of a lower underdrain portion and an upper open welled portion that is aligned with the underdrains of the lower plate portion. These plates can be secured together by adhesives, ultrasonic or vibration welding or mechanical devices such as clamps, screws, rivets, rubber bands, snap fits, etc.

The skiving device of the present invention is preferably produced by a punch pin made of M2 HSS (high speed steel), hardened to Rockwell C61-63. Metal is preferred as it makes a clean skive and has a long lasting edge that is capable of being resharpened after extensive use. Alternatively, ceramic or glass punches and other materials harder than the material being skived and which are capable of forming the mechanical interlock of the present invention may be used if desired.

Figure 4:
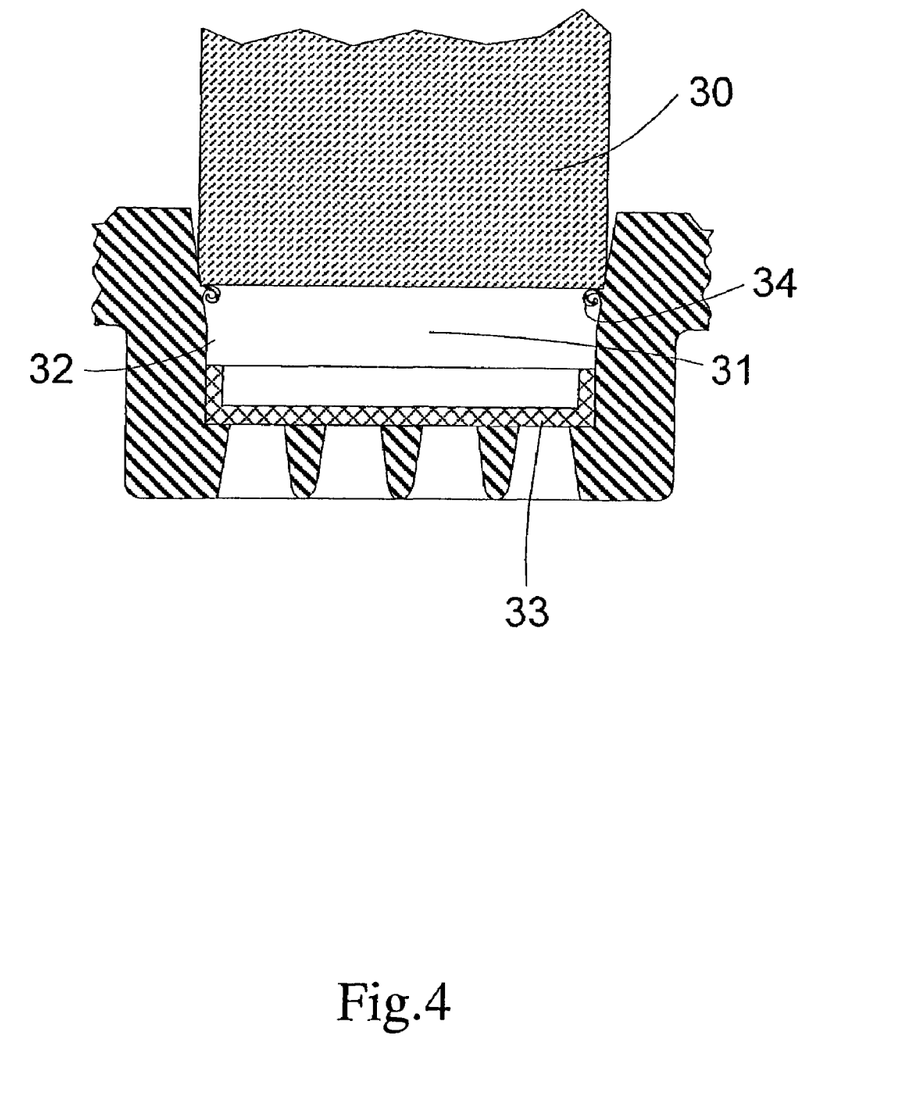
FIG. 4 illustrates a cross-section of a well of the present invention during the formation of the mechanical interlock.

FIG. 4 shows the device of the skiving device 30, in this example the pin, as it enters the well 31. As can be seen the skiving device 30 encounters at least a portion of the inner wall surface 32 above the location of the filter 33 and begins to form a continous roll 34 of wall material that stays attached to the wall after completion of the skiving and which mechanically interlocks the filter 33 in place within the well 31.

The depth to which the skiving device travels can be varied by varying the thickness of the stripper plate spacer and its shims on the press used to exert the force on the pin. The length of the skive is controlled by the wall configuration (tapered or not), the punch design and the amount of material needed to form the skive or interlock.

As such, the height of the skive is pre-determined and it can be controlled to a great degree of specificity, such that it is envisioned that the present invention would be useful for higher density well formats, such as 384 or 1536 wells per plate. The use of multiple skiving devices at the same time in two or more wells is also possible and preferred as it reduces the number of steps required to make the present invention in a multi-well format. The use of an equal number of skiving devices to the number of wells each aligned with each other is preferred. This is particularly possible with multiple well plates as the wells are typically uniformly aligned and arranged. This allows one to set up one master jig with an alignment pin that matches the plate wells to the jig and allows for repeatedly accurate mechanical interlocks to be formed in all wells.

Figure 5A:
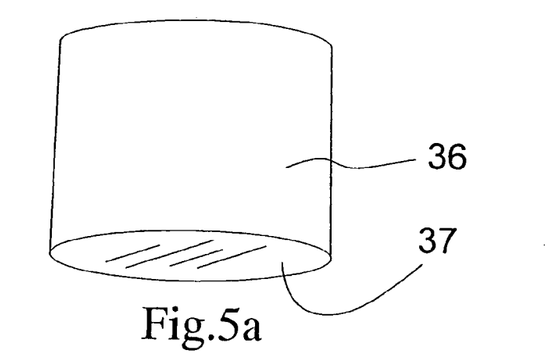
Figure 5B:
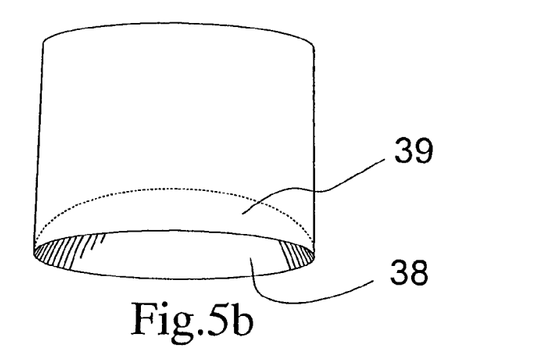
Figure 5C:
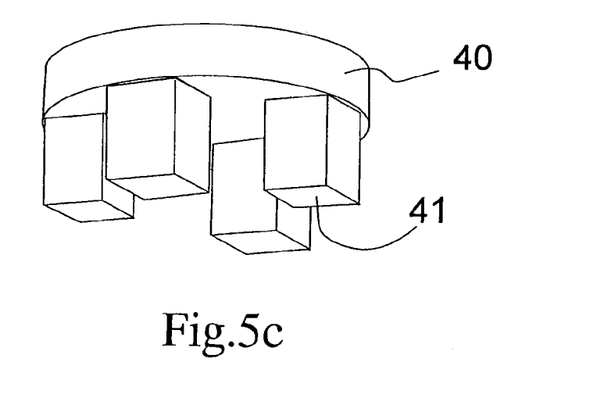

FIGS. 5a-5c show some, but not all of the punch pin designs that can be used to form the mechanical interlock or crimp of the present invention. FIG. 5a shows a punch 36 with a relatively flat cutting surface 37 which forms a skive around the entire perimeter of the inner wall of the well. FIG. 5b shows an alternative design wherein the bottom center portion 38 of the skiving device 39 is recessed. FIG. 5c shows a skiving device 40 in which a series of cutters 41 are formed in the device 40 so that one creates a series of small mechanical interlocks rather than one continuous interlock. In those applications where the diameter at bottom of the well is larger than at the top, expandable dies may be used or smaller diameter dies, applied at an angle to a lower portion of the well wall may be used.

In a further embodiment of the present invention can use mild heat applied to the inner wall of the device to soften the material and make it flow as a continuous piece in forming the interlock. Such heat can be applied by preheating the device in an oven or by the use of heat lamps or heating rods placed within the wells or by applying heat, such as through a resistance heater, to the skiving device which then transfers that heat to the inner wall of the device. The temperature selected can be from about above room temperature to about a temperature close to or above the softening point of the material from which it is made. Preferably, it should not be to a temperature at or above the melting point of the well material or a temperature at which the material distorts or degrades.

EXAMPLE

A multi-well device according to the present invention was made by taking a standard multiwell plate, a MULTI-SCREEN® harvester plate available from Millipore Corporation of Bedford Mass., which had 96 wells, each having an inward taper of 7 degrees toward the vertical center line of the wells. The wells had an integral underdrain on which one or more pieces of filtration filter could be laid. The wells had a top inner diameter of 0.250 inch (6.35 mm) and an inner diameter of 0.2338 inch (5.94 mm) adjacent the underdrain. Each well had a depth of 0.125 inch (3.17 mm). The plate was made of a mixture of styrene acrylonitrile polymer (SAN) with titanium dioxide as a colorant. A glass mat filter was used in each well. Each piece of filter had a diameter of 0.300 inch (7.62 mm) and was set by hand into each well on the upper surface of the underdrain such that a portion of the mat extended upwardly along the inner surface of the well. (as shown in FIG. 1)

A punch pin made of M2 HSS (high speed steel), hardened to Rockwell C 61-63 having a diameter of 0.2420 inch (6.15 mm) was used in each well to form the skive.

The punch traveled a portion of the way into the well before encountering the inner wall surface (approximately 0.049 inch (1.24 mm)). Once encountered, the punch skived a portion of the wall in a continuous, rolling collar until it reached a point adjacent the location of the filter.

A dye from a felt tipped pen (red) was applied to the inner surface of the wells before the skiving took place merely to enhance the visualization of the process and its effect. In practice, a dye is not required. Microphotographs were taken and showed that the plastic of the inner wall had in fact been skived and formed a mechanical retention device for the filter in the well.

Figure 6:
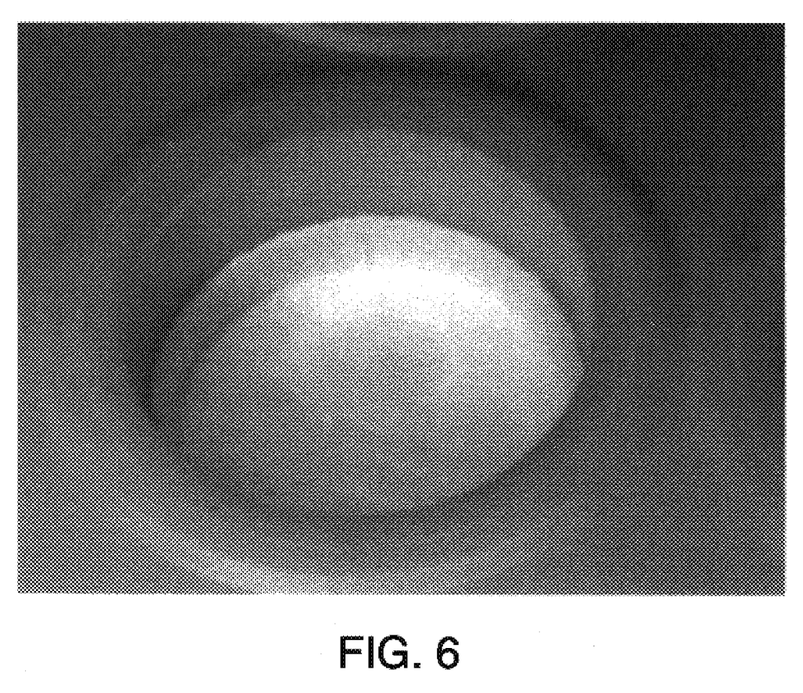
FIG. 6 is a photograph of a prior art well.

FIG. 6 is a photograph of a prior art well that has not been stained. Note the filter is located therein and the lack of any skive or permanent retention means.

Figure 7:
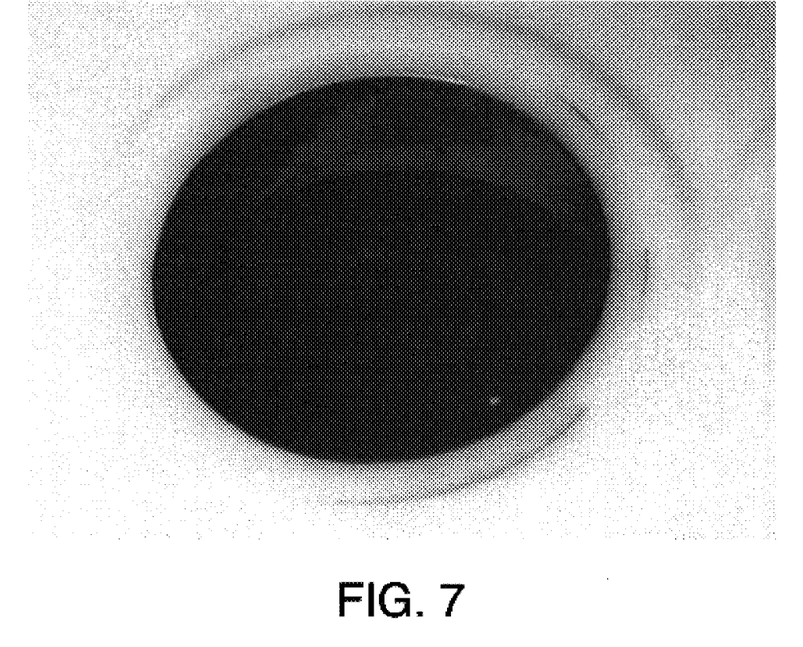
FIG. 7 is a photograph of a prior art well.

FIG. 7 is a photograph of a prior art well that has been stained with the same dye described above for illustration purposes only. It is provided to contrast with FIG. 8. In FIG. 7, there is no band of clear material.

Figure 8:
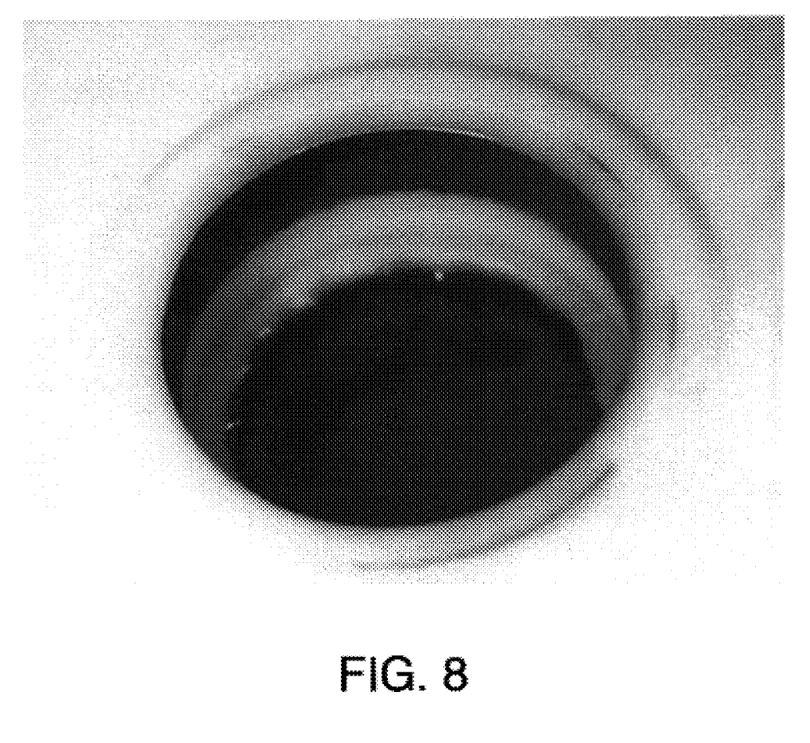
FIG. 8 is a photograph of a well of the present invention after formation of the mechanical interlock.

FIG. 8 is a photograph of a skived well of the present invention that was stained prior to skiving as described above. Note the clear band 51 represents a portion of the wall that was skived as well as the crimp or mechanical interlock 52 that is formed in overlapping the filter 53.

The present invention while primarily discussed in relationship to multiple well devices can also be of benefit in single well devices such as CENTRICON® centrifugal devices available form Millipore Corporation of Bedford, Mass. and other such devices where the filter is retained within some type of well or opening that provides a wall that can be skived to form the mechanical interlock. It is meant by the above specification and the attached claims to cover all such embodiments and obvious extensions of the present invention.

The invention claimed is:

1. A method for securing a filter within a filtration device, comprising selecting a thermoplastic filtration device with one or more wells, each well having an inner wall, one or more filters retained within each well of the device and skiving a portion of the inner wall to form a mechanical interlock in the form of a continuous roll of inner wall material of the well against a top of the one or more filters to form an interference fit with the one or more filters and fixes the one or more filters to the device.

2. The method of claim 1 wherein the portion of the wall is skived by a punch having a diameter greater than that of the inner diameter of the inner wall of the well above and adjacent the filter.

3. The method of claim 1 wherein the portion of the wall is skived by a punch having a diameter greater than that of the inner diameter of the inner wall of the well above and adjacent the filter and at least one cutting surface to form the mechanical interlock.

4. The method of claim 1 wherein the portion of the wall is skived by a punch having a diameter greater than that of the inner diameter of the inner wall of the well above and adjacent the filter and having at least two cutting surfaces to form a series of the mechanical interlocks.

5. The method of claim 1 wherein the portion of the wall has an outward taper as it progresses from a top of the well toward the filter in the well and inner wall is skived by a expandable punch that upon expansion has a diameter greater than that of the inner diameter of the inner wall of the well above and adjacent the filter and the punch forms at least one cutting surface to form the mechanical interlock.

6. The method of claim 1 wherein the inner wall of the well is heated either before or during the skiving.

7. The method of claim 1 wherein the inner wall of the well is heated during the skiving.

* * * * *